(12) United States Patent
Cai

(10) Patent No.: US 12,507,822 B2
(45) Date of Patent: Dec. 30, 2025

(54) ARTIFICIAL CHRISTMAS TREE

(71) Applicant: Winners Group Industries Company Limited, Guangxi Zhuang Autonomous Reg. (CN)

(72) Inventor: Junhao Cai, Dongguan (CN)

(73) Assignee: WINNERS GROUP INDUSTRIES COMPANY LIMITED, Guangxi Zhuang Autonomous Region (CN)

( * ) Notice: Subject to any disclaimer, the term of this patent is extended or adjusted under 35 U.S.C. 154(b) by 0 days.

(21) Appl. No.: 18/818,270

(22) Filed: Aug. 28, 2024

(65) Prior Publication Data

US 2025/0366648 A1    Dec. 4, 2025

(30) Foreign Application Priority Data

May 28, 2024   (CN) .......................... 202421190756.2

(51) Int. Cl.
*A47G 33/06*    (2006.01)
*F21V 23/02*    (2006.01)
*H02J 50/10*    (2016.01)

(52) U.S. Cl.
CPC .............. *A47G 33/06* (2013.01); *F21V 23/02* (2013.01); *H02J 50/10* (2016.02)

(58) Field of Classification Search
CPC ........... A47G 33/06; H02J 50/10; F21V 23/02

USPC .......................................................... 362/123
See application file for complete search history.

(56) References Cited

U.S. PATENT DOCUMENTS

| | | |
|---|---|---|
| 5,118,196 A | 6/1992 | Ault et al. |
| 10,178,887 B1 * | 1/2019 | Chen ...................... A41G 1/007 |
| 11,793,342 B1 | 10/2023 | Hall |
| 2017/0181560 A1 | 6/2017 | Zhou |
| 2020/0044453 A1 * | 2/2020 | Lyden ..................... H10F 19/00 |
| 2022/0399757 A1 * | 12/2022 | Szweda ................. H02J 7/0063 |

* cited by examiner

*Primary Examiner* — James R Greece
*Assistant Examiner* — Hana S Featherly
(74) *Attorney, Agent, or Firm* — MUNCY, GEISSLER, OLDS & LOWE, P.C.

(57) ABSTRACT

The present application discloses an artificial Christmas tree, including: a base, a tree body unit and a wireless energizing unit; wherein, the tree body unit is installed on the base and extends upwards, the wireless energizing unit is provided on the tree body unit and includes a power cable, at least one wireless transmitting module and at least one wireless receiving module, the power cable is electrically connected to the wireless transmitting module and supplies power to the wireless transmitting module, so that the wireless transmitting module generates a magnetic field, the wireless receiving module is affected by the magnetic field generated by the wireless transmitting module and generates electrical energy.

12 Claims, 4 Drawing Sheets

ARTIFICIAL CHRISTMAS TREE

CROSS-REFERENCE TO RELATED APPLICATION

This application claims priority to Chinese Patent Application No. CN202421190756.2 filed on May 28, 2024, the entire content of which is hereby incorporated by reference.

FIELD OF TECHNOLOGY

The present application relates to the technical field of decoration technologies, and in particular to an artificial Christmas tree.

BACKGROUND

As one of the most common decorations, Christmas trees are not only present during festive occasions like Christmas, but also used to decorate stores, hotel entrances, and lobbies to create a convivial atmosphere in daily life. A traditional Christmas tree is a fir or a pine decorated with lights, candles and ornaments, which does not align with modern concept of environmental protection, and it is difficult to maintain a unified shape. Therefore, artificial Christmas trees have appeared in recent years. The artificial Christmas trees may closely simulate the appearance of natural ones, and further add dynamic effects, like moving branches, through electrical apparatus such as motors. However, both natural and artificial Christmas trees require an installation of ornaments such as decoration lights. Accordingly, wiring needs to be done from a top to a bottom of a Christmas tree, resulting in a complex circuit of the Christmas tree. Especially in the case of the artificial Christmas trees with additional electrical apparatus, the complex circuit increases a difficulty of installation and maintenance of the Christmas tree.

SUMMARY

According to an aspect of this disclosure, an artificial Christmas tree is disclosed.

An artificial Christmas tree includes a base, a tree body unit and a wireless energizing unit; wherein, the tree body unit is installed on the base and extends upwards, the wireless energizing unit is provided on the tree body unit and includes a power cable, at least one wireless transmitting module and at least one wireless receiving module, the power cable is electrically connected to the wireless transmitting module and supplies power to the wireless transmitting module, so that the wireless transmitting module generates a magnetic field, the wireless receiving module is affected by the magnetic field generated by the wireless transmitting module and generates electrical energy.

BRIEF DESCRIPTION

DETAILED DESCRIPTION

In the description of the present application, it should be understood that the terms "center", "longitudinal", "transverse", "upper", "lower", "front", "rear", "left", "right", "vertical", "horizontal", "top", "bottom", "inner", and "external" etc., should be construed to refer to the orientations as then described or shown in drawings under discussion. These relative terms are for convenience of description and do not indicate or imply that the device or element must have a specific orientation, be constructed or operated in a specific orientation, and therefore should not be understood as a limitation on the present application. In the description of the present application, the phrase "a plurality of" means two or more unless otherwise indicated.

An artificial Christmas tree of the present application is provided with a wireless electrifying apparatus on a tree body, thus reducing wiring and simplifying a circuit.

Figure 1:
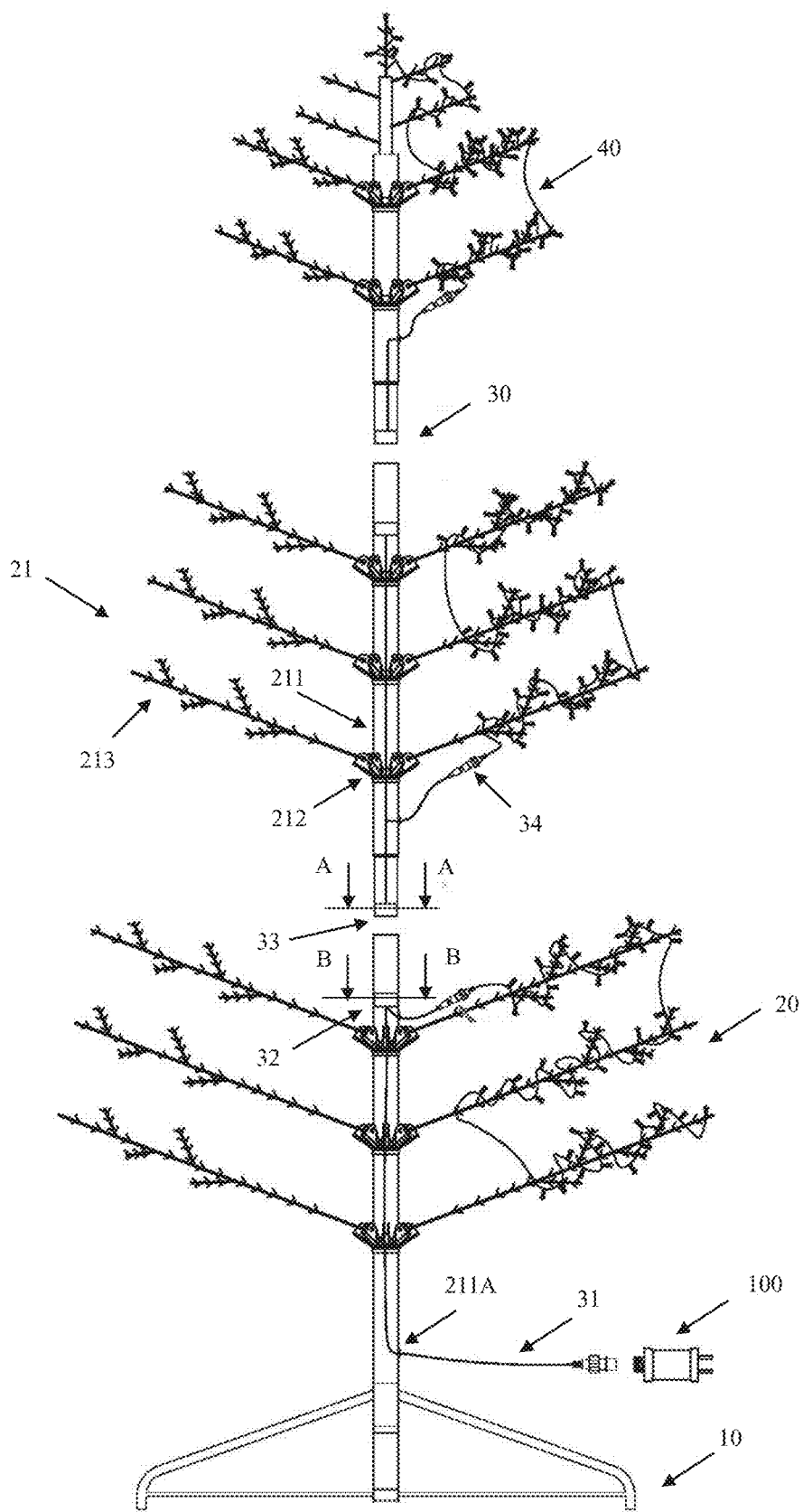
FIG. 1 is a schematic diagram of an overall structure of an artificial Christmas tree provided with an internal type wireless energizing unit of the present application.
Figure 2:
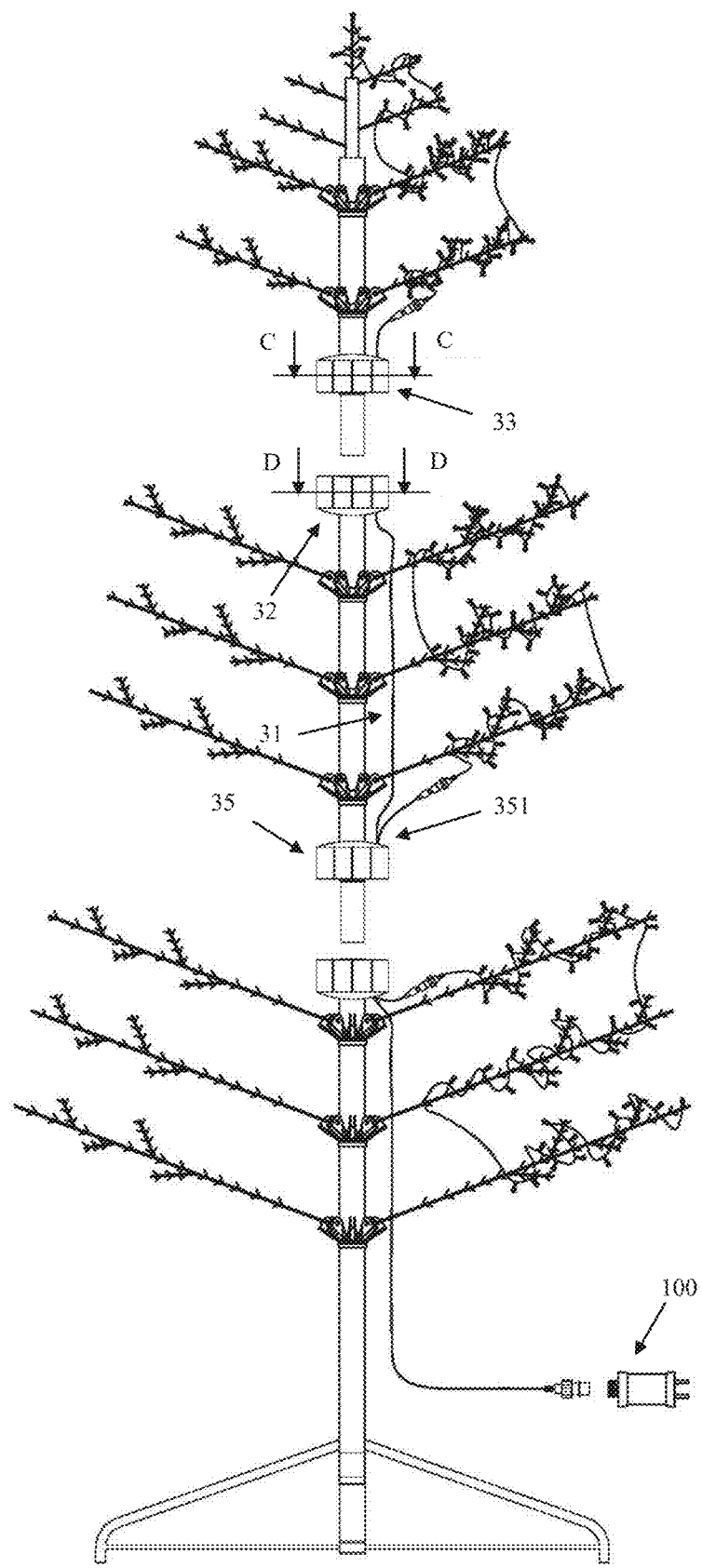
FIG. 2 is a schematic diagram of an overall structure of an artificial Christmas tree provided with an external type wireless energizing unit of the present application.
Figure 3:
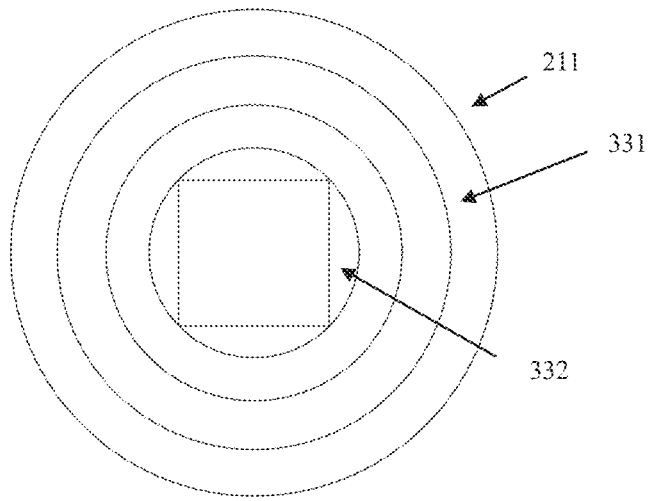
FIG. 3 is a partial sectional diagram along the line A-A in FIG. 1.
Figure 4:
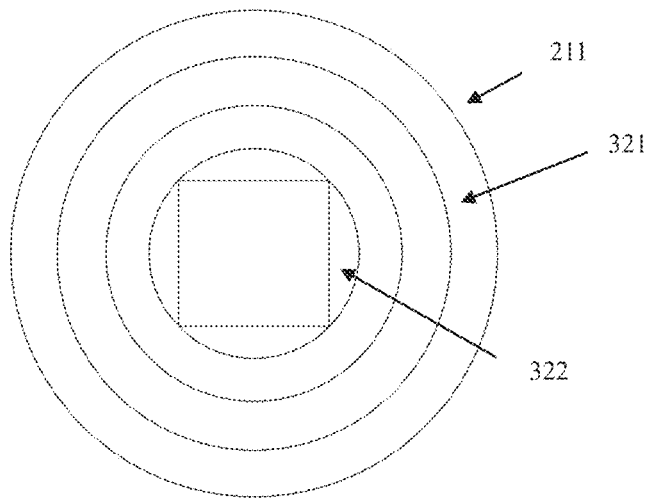
FIG. 4 is a partial sectional diagram along the line B-B in FIG. 1.
Figure 5:
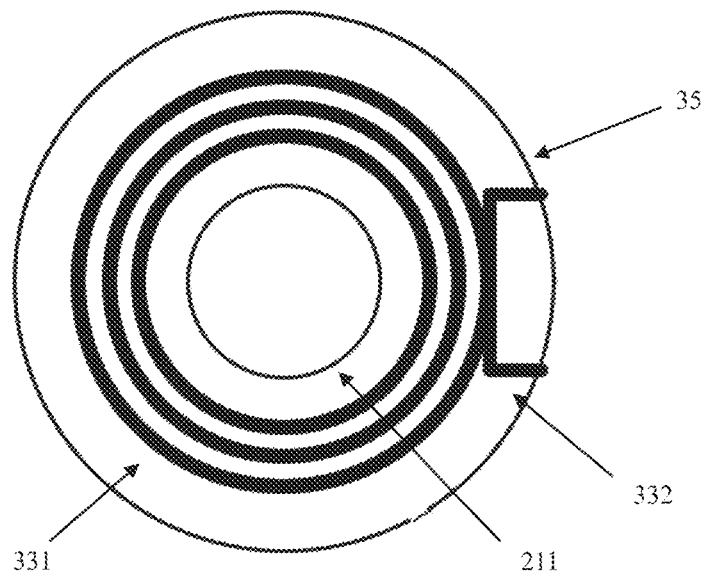
FIG. 5 is a partial sectional diagram along the line C-C in FIG. 2.
Figure 6:
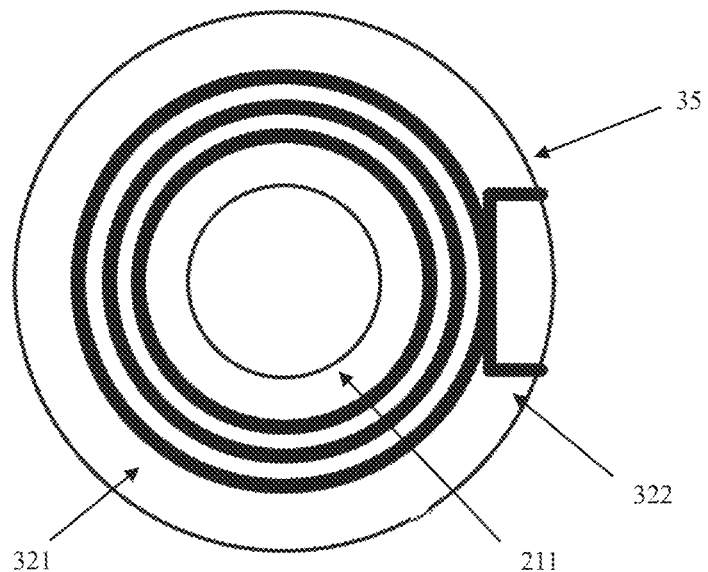
FIG. 6 is a partial sectional diagram along the line D-D in FIG. 2.

Specifically, please refer to FIG. 1. The artificial Christmas tree of the present application includes a base 10, a tree body unit 20, a wireless energizing unit 30 and a lamp group 40. The base 10 is settled to a floor and supports the tree body unit 20 extending upwardly. The wireless energizing unit 30 is arranged on the tree body unit 20 along a vertical direction. The lamp group 40 is provided on the tree body unit 20 and electrically connected to the wireless energizing unit 30.

Wherein, the tree body unit 20 includes at least one tree body assembly 21. The tree body assembly 21 includes a main trunk 211, a mounting seat 212 and a branch 213. The main trunk 211 is fixed above the base 10 and extends along a vertical direction. The mounting seat 212 is sleeved on the main trunk 211 and arranged along a vertical direction. A plurality of branches 213 is inserted in each mounting seat 212 circumferentially. One end of the branch 213 is hinged to the mounting seat 212, and the other end may be rotated along an axis away from or near to the main trunk 211. The lamp group 40 is provided on the branch 213. Wherein, the same lamp group 40 may be connected between different branches 213, then connected to the wireless energizing unit 30. Or, one lamp group 40 is provided on each branch 213, and each lamp group 40 is connected to the wireless energizing unit 30 respectively. Furthermore, there are two or more tree body assemblies 21 arranged along a vertical direction. A bottom of a main trunk 211 of an upper tree body assembly of every two adjacent tree body assemblies of the two or more tree body assemblies 21 is inserted into a top of a main trunk 211 of a lower tree body assembly of every two adjacent tree body assemblies of the two or more tree body assemblies 21, and a lowest main trunk 211 is inserted into the base 10, thus the artificial Christmas tree with different heights is spliced sequentially.

The wireless energizing unit 30 includes a power cable 31, at least one wireless transmitting module 32 and at least one wireless receiving module 33. In a lowest wireless energizing unit 30, one end of the power cable 30 is near to the base 10 and electrically connected to a direct current power supply 100, another end of the power cable 30 is electrically connected to the wireless transmitting module 32. The wireless transmitting module 32 and the wireless receiving module 33 are installed on the main trunk 211 and are closed to each other. The wireless receiving module 33 is electrically connected to the at least one lamp group 40 and supply power to the lamp group 40. The wireless transmitting module 32 is provided with a wireless transmitting coil 321 and a transmitting module 322 electrically connected to the wireless transmitting coil 321. The wireless receiving module 33 is provided with a wireless receiving coil 331 and a receiving module 332 electrically connected to the wireless receiving coil 331. When the direct current power supply 100 is connected and generates an alternating current signal through an oscillating circuit, the wireless transmitting coil 321 is energized and generates an alternating magnetic field. The wireless receiving coil 331 is affected by the alternating magnetic field generated by the wireless transmitting coil 321 and converts an electromagnetic energy into an electrical energy to supply power to the lamp group 40. There is no need to dispose cables between the wireless transmitting module 32 and the wireless receiving module 33, and a transmission of the electrical energy is achieved in a range of magnetic field, thus reducing cables of the artificial Christmas tree and simplifying the wiring. In addition, in this embodiment, the wireless energizing unit 30 is configured to supply power to the lamp group 40, however, according to actual needs, other electrical apparatus such as motors may be electrically connected to the wireless receiving module 33, and are powered by the wireless energizing unit 30.

Furthermore, there are two or more wireless energizing units 30 installed on the main trunk 211 along a vertical direction. A wireless transmitting module 32 of an upper wireless energizing unit of the two or more wireless energizing units 30 is near to a wireless receiving module 33 of a lower wireless energizing unit of the two or more wireless energizing units 30. And a power cable 31 of the upper wireless energizing unit of the two or more wireless energizing units 30 is electrically connected to the wireless receiving module 33 of the lower wireless energizing unit of the two or more wireless energizing units 30. A power cable 31 of a lowest wireless energizing unit of the two or more wireless energizing units 30 is connected to the direct current power supply 100. When the direct current power supply 100 is connected, a lowest wireless transmitting module 32 generates the alternating magnetic field, the lowest wireless receiving module 33 generates electrical energy and supplies power to an upper wireless transmitting module 32 thereof. The upper wireless transmitting module 32 thereof generates the alternating magnetic field consequently, so that an upper wireless receiving module 33 generates electrical energy simultaneously, each wireless energizing unit 30 is powered on sequentially, so that the lamp group 40 on the whole of the artificial Christmas tree is lighted. Providing a plurality of energizing units 30 can conveniently set a circuit according to positions of electrical apparatus such as the lamp group 40, reducing a length of cable.

Furthermore, the wireless transmitting module 32 and the wireless receiving module 33 of the same wireless energizing unit 30 are located between two adjacent tree body assemblies of the two or more tree body assemblies 21 respectively. Wherein, the wireless transmitting module 32 is located at a top of a lower main trunk 211, the wireless receiving module 33 is located at a bottom of an upper main trunk 211. When the bottom of the upper main trunk 211 is inserted into the top of the lower main trunk 211, the wireless transmitting module 32 and the wireless receiving module 33 are closed to each other, thus reducing a required number of the wireless energizing unit 30.

Furthermore, in an embodiment, the wireless energizing unit 30 is an internal type, the main trunk 211 is an internal hollow cylinder. The wireless transmitting coil 321 and the wireless receiving coil 331 are provided inside the main trunk 211 respectively. The wireless transmitting coil 321 is coiled around an outside of the transmitting module 322 along an axis extending vertically, and the wireless receiving coil 331 is coiled around an outside of the receiving module 332 along an axis extending vertically. The power cable 31 passes through an interior of the main trunk 211 to simplify an outside structure of the artificial Christmas tree. An outer sidewall of the main trunk 211 is provided with a through hole 211A communicated with the interior of the main trunk 211, cables of the lamp group 40 are communicated with the interior of the main trunk 211 through the through hole 211A. In this embodiment, the wireless energizing unit 30 further includes a joint 34, one end of the joint 34 is electrically connected to the wireless receiving coil 331 through a cable, and the other end is located at an outside of the main trunk 211 and threadedly connected to a cable of the lamp group 40.

In another embodiment, the wireless energizing unit 30 is an external type, and further includes two or more housings 35 with an opening provided at one side. The housing 35 is sleeved on the outside of the main trunk 211. A gap is provided between an inner wall of the housing 35 and an outer sidewall of the main trunk 211. The wireless transmitting coil 321 is coiled between the inner wall of a lower housing 35 and the outer sidewall of a lower main trunk 211 around an axis extending vertically. The transmitting module 322 is provided on one side of the wireless transmitting coil 321 and is located between the wireless transmitting coil 321 and the housing 35. The wireless receiving coil 331 is coiled between the inner wall of an upper housing 35 and the outer sidewall of an upper main trunk 211 around an axis extending vertically. The receiving module 332 is provided on one side of the wireless receiving coil 331 and located between the wireless receiving coil 331 and the housing 35. In this embodiment, an outline of a cross-section of the main trunk 211 is a round shape. The housing 35 surrounds around the outer side of the main trunk 211, and a connecting hole 351 communicated with an interior of the housing 35 is provided on the housing 35. When in use, the opening of an upper housing 35 is opposite to the opening of a lower housing 35. After two housings 35 are combined to form a box body, the wireless transmitting coil 321 and the wireless receiving coil 331 are sealed into the two housings 35, and cables of the lamp group 40 are connected to an interior of the housing 35 through the connecting hole 351.

In addition, according to needs, in the same one artificial Christmas tree, some main trunks 211 may be provided with external type wireless energizing units 30, and other main trunks 211 may be provided with internal type wireless energizing units 30. Or, all the main trunks 211 are provided with external type wireless energizing units 30, or all the main trunks 211 are provided with internal type wireless energizing units 30.

Compared with the prior art, the artificial Christmas tree of the present application has simple wiring and good stability, which may reduce occurrences of failures. Further, it is easy to be installed and is easy to maintenance. In addition, a height of the artificial Christmas tree is convenient to be adjusted, and the artificial Christmas tree has a simple outer structure, and may supply power to different electrical apparatus including lamp groups.

The above-mentioned embodiments only express several implementation modes of the present application, and the description is relatively specific and detailed, but should not be understood as limiting the scope of the present application. It should be noted that, for those of skill in the art, several variations, modifications, substitutions, and variants may be made without departing from the concept of the present application.

What is claimed:

1. An artificial Christmas tree, comprising:
a base, a tree body unit and a wireless energizing unit; wherein,
the tree body unit is installed on the base and extends upwards, comprising a main trunk, the main trunk extends along a vertical direction, the wireless energizing unit is provided on the main trunk;
the wireless energizing unit includes a power cable, at least one wireless transmitting module and at least one wireless receiving module, the power cable is electrically connected to the wireless transmitting module and supplies power to the wireless transmitting module, so that the wireless transmitting module generates a magnetic field, the wireless receiving module is affected by the magnetic field generated by the wireless transmitting module and generates electrical energy; the wireless transmitting module includes a wireless transmitting coil and a transmitting module electrically connected to the wireless transmitting coil, the wireless receiving module includes a wireless receiving coil and a receiving module electrically connected to the wireless receiving coil;
wherein, at least one wireless energizing unit is an external type; in the external type wireless energizing unit, the wireless transmitting coil is coiled around an outer side of the main trunk, the transmitting module is provided on one side of the wireless transmitting coil; the wireless receiving coil is coiled around the outer side of the main trunk, the receiving module is located at one side of the wireless receiving coil;
on the same main trunk, the upper transmitting module of one wireless energizing unit is electrically connected to the lower receiving module of the other wireless energizing unit by a power cable.

2. The artificial Christmas tree of claim 1, wherein, the tree body unit further includes a mounting seat and a branch; the mounting seat is sleeved on the main trunk, the branch is hinged to the mounting seat.

3. The artificial Christmas tree of claim 2, wherein, there are two or more wireless energizing units arranged on the main trunk along a vertical direction.

4. The artificial Christmas tree of claim 3, wherein, the power cable at the bottom is configured to connect to a direct current power supply.

5. The artificial Christmas tree of claim 4, wherein further comprises
at least one internal-type wireless energizing unit, comprises at least one internal-type wireless transmitting module and at less one internal-type wireless receiving module; the wireless transmitting module includes an internal-type wireless transmitting coil and an internal-type transmitting module electrically connected to the internal-type wireless transmitting coil, the internal-type wireless receiving module includes an internal-type wireless receiving coil and an internal-type receiving module electrically connected to the internal-type wireless receiving coil;
the internal-type wireless transmitting coil is coiled around an outer side of the internal-type transmitting module and located inside the main trunk, the internal-type wireless receiving coil is coiled around the internal-type receiving module and located inside the main trunk
when the internal-type wireless transmitting module generates a magnetic field, the internal-type wireless receiving module is affected by the magnetic field generated by the internal-type wireless transmitting module and generates electrical energy.

6. The artificial Christmas tree of claim 2, wherein, there are two or more tree body units arranged along a vertical direction; an upper main trunk of the two or more tree body is inserted into a lower main trunk of the two or more main trunks, a lowest main trunk of the two or more main trunks is fixedly connected to the base.

7. The artificial Christmas tree of claim 6, wherein, the same wireless energizing unit is installed on two adjacent tree body units of the two or more tree body units; wherein, the wireless transmitting module is installed on a top of a lower main trunk of the two adjacent tree body units, and the wireless receiving module is installed on a bottom of an upper main trunk of the two adjacent tree body units.

8. The artificial Christmas tree of claim 2, wherein, at least one wireless energizing unit is an internal-type, wherein the wireless transmitting coil is coiled around an outer side of the transmitting module and located inside the main trunk, the wireless receiving coil is coiled around an interior of the receiving module and located inside the main trunk.

9. The artificial Christmas tree of claim 8, wherein, the wireless energizing unit further includes a housing, the housing is sleeved on the outer side of the main trunk; the wireless transmitting module and the wireless receiving module are located inside the housing.

10. The artificial Christmas tree of claim 8, further comprising a lamp group, wherein the lamp group is provided on the branch and electrically connected to the wireless receiving module.

11. The artificial Christmas tree of claim 1, further comprising a lamp group, the lamp group is provided on the branch and electrically connected to the wireless receiving module.

12. An artificial Christmas tree, comprising:
a base, the base is located at the bottom of the artificial Christmas tree;
a tree body unit, the tree body unit is installed on the base, comprising two or more main trunk, the main trunk extends along a vertical direction; and
at less one external type wireless energizing unit, comprising at less one external type wireless transmitting module, at less one external type wireless receiving module and two or more housings; the housings are provided with an opening at one side, the housings are sleeved on one end of each two adjacent main trunks close to each other, the openings of two adjacent housings are provided opposite each other and a gap is provided between the housing and the main trunk to combine a box body;
the external type wireless transmitting module comprises an external type wireless transmitting coil and an external type transmitting module electrically connected to the wireless transmitting coil, the external type wireless transmitting coil is coiled around an outer side of the lower main trunk and inside the lower housing, the external type transmitting module is provided on one side of the external type wireless transmitting coil and between the housing and the external type wireless transmitting coil;

the external type wireless receiving module comprises an external type wireless receiving coil and an external type receiving module electrically connected to the wireless receiving coil; the external type wireless receiving coil is coiled around an outer side of the upper main trunk and inside the upper housing, the external type receiving module is located at one side of the external type wireless receiving coil and between the housing and the external type wireless receiving coil;

when the external type wireless transmitting module generates a magnetic field, the external type wireless receiving module is affected by the magnetic field generated by the external type wireless transmitting module and generates electrical energy.

* * * * *